United States Patent
Baier et al.

(10) Patent No.: US 6,781,975 B1
(45) Date of Patent: Aug. 24, 2004

(54) WIRELESS TELECOMMUNICATIONS SYSTEM WITH A CDMA, FDMA AND TDMA MULTIPLE ACCESS COMPONENT, ESPECIALLY A "JD-CDMA" TELECOMMUNICATIONS SYSTEM WITH HYBRID MULTIPLE ACCESS TECHNIQUES

(75) Inventors: Paul Walter Baier, Kaiserslautern (DE); Jürgen Mayer, Schifferstadt (DE); Johannes Schlee, Kaiserslautern (DE); Tobias Weber, Otterbach (DE); Chritoph Euscher, Rhede (DE); Stefan Bahrenburg, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/463,070

(22) PCT Filed: Oct. 1, 1997

(86) PCT No.: PCT/DE97/02267

§ 371 (c)(1),
(2), (4) Date: Jan. 18, 2000

(87) PCT Pub. No.: WO99/04512

PCT Pub. Date: Jan. 28, 1999

(30) Foreign Application Priority Data

Jul. 15, 1997 (DE) .......................................... 197 30 316

(51) Int. Cl.$^7$ ............................. H04B 7/26; H04B 7/204

(52) U.S. Cl. ...................... 370/335; 370/336; 370/342; 370/347

(58) Field of Search ................................. 370/320, 321, 370/335, 337, 347, 342, 441, 523, 329, 341

(56) References Cited

FOREIGN PATENT DOCUMENTS

| EP | 0 651 523 A2 | 5/1995 |
|---|---|---|
| EP | 0 662 775 A1 | 7/1995 |
| JP | 0651523 A2 * | 10/1994 |
| WO | WO 93/21719 | 10/1993 |

OTHER PUBLICATIONS

Klein et al. "Known and Novel Diversity Approaches as a Powerful Means to Enhance the Performance of Cellular Mobile Radio Systems", IEEE Journal on Selected Areas in Communications (1996).*

Steele, "Mobile Radio Communications", Pentech Press, pp. 691–695.

Baier et al., "Recent Results Concerning the Benefit of Joint Detection in CDMA Systems", 1993 The Institution of Electrical Engineers, pp. 5/1–4.

(List continued on next page.)

*Primary Examiner*—Chau Nguyen
*Assistant Examiner*—Soon-Dong Hyun
(74) *Attorney, Agent, or Firm*—Bell Boyd & Lloyd LLC

(57) ABSTRACT

In order to compatibly adapt a wireless telecommunication system with a CDMA, FDMA and TDMA multiple access component, particularly a hybrid "JD-CDMA" telecommunication system with respect to multiple access methods, to a GSM-specific/DECT-specific (micro-cell, macro-cell and/or Pico cell-specific) telecommunication system with respect to the air interface, signaling information fashioned as "stealing flag" for distinguishing between payload and signaling channels are first arranged such in a provided time slot structure that an asymmetrical division of the time slot data arises with respect to a training data block (midamble) of the time slot structure and, second, the transmission time duration for the provided time slot structure of a data element fashioned as "chip" and contained in the time slot structure is dimensioned such that this is a multiple of a predetermined clock frequency—for example, GSM/DECT-specific clock frequency—covering the numerical range from 5 through 7.

15 Claims, 4 Drawing Sheets

OTHER PUBLICATIONS

Zimmermann, "Anwendung von CDMA (Code Division Multiple Access) in der Mobilkommunikation", pp. 67–75.

Andermo et al., "A CDMA–Based Radio Access Design for UMTS", IEEE Personal Communications, Feb. 1995, pp. 48–53.

Baier, "Spread–Spectrum–Technik und CDMA", telekom praxis, 5/95, pp. 9–14.

Baier et al., "CDMA Myths and Realities Revisited", IEICE Trans. Fundamentals, pp. 1930–1937.

Baier et al., "CDMA—ein günstiges Vielfachzugriffsverfahren für frequenzselektive und zeitvariante Mobilfunkkanäle", Nachrichtentechn., Elektron., Berlin 41, pp. 223–227.

Jung et al., "Konzept eines CDMA–Mobilfunksystems mit gemeinsamer Detektion für die dritte Mobilfunkgeneration, Teil 1", pp. 10–14 and pp. 24–27

Klein et al., "Known and Novel Diversity Approaches as a Powerful Means to Enhance the Performance of Cellular Mobile Radio Systems", IEEE Journal on Selected Areas in Communications, pp. 1784–1795.

Urie et al., "An Advanced TDMA Mobile Access System for UMTS", IEEE Personal Communications, Feb. , 1995, pp. 38–47.

Informatik Spektrum 14 (1991) Juni, Nr. 3, Berlin, DE, A. Mann: "Der GSM Standard–Grundlage fur digitale europaische Mobilfunknetze", pp. 137–152.

Philips Telecommunication Review, vol. 49, No. 3, Sep. 1992, R.J. Mulder: "DECT, a universal cordless access sytem".

Nachrichtentechnik Elektronik 42, Jan./Feb. 1992, No. 1, Berlin, U. Pilger: "Struktur des DECT–Standards", pp. 23–29.

telcom report 16, 1993, No. 1, J.H. Koch: "Digitaler Komfort fur schnurlose Telekommunikation—DECT–Standard eroffnet neue Nutzungsgebiete", pp. 26–27.

IEEE Communications Magazine, Jan. 1995, pp. 50–57, D.D. Falconer et al., "Time Division Multiple Access Methods for Wireless Personal Communications".

tec/2/93—Das technische Magazin von Ascom Wege zur universellen mobilen Telekommunikation, pp. 35–42.

European Telecommunication Standard—ETS 300 175–1.

European Telecommunication Standard ETS 300 175–3.

Eruopean Telecommunication Standard—ETS 300 175–4.

European Telecommunication ETS 300 175–5.

European Telecommunication Standard—ETS 300 175–6.

European Telecommunication Standard ETS 300 175–7.

Eruopean Telecommunication Standard—ETS 300 175–8.

European Telecommunication ETS 300 175–9.

* cited by examiner

WIRELESS TELECOMMUNICATIONS SYSTEM WITH A CDMA, FDMA AND TDMA MULTIPLE ACCESS COMPONENT, ESPECIALLY A "JD-CDMA" TELECOMMUNICATIONS SYSTEM WITH HYBRID MULTIPLE ACCESS TECHNIQUES

BACKGROUND OF THE INVENTION

1. Field of the Invention

The present invention relates generally to a method for adapting wireless telecommunication systems to be compatible with multiple access telecommunication systems.

2. Description of the Related Art

In message systems having a message transmission path between a message source and a message destination transmission and reception devices are employed for message processing and transmission, whereby 1) the message processing and message transmission can ensue in a preferred transmission direction (which is referred to as simplex mode) or in both transmission directions (which is referred to as duplex mode);
2) the message processing is analog or digital;
3) the message transmission via the long distance transmission path is wire-bound or ensues on the basis of various message transmission methods FDMA (frequency division multiple access), TDMA (time division multiple access) and/or CDMA (code division multiplex access)— for example, according to radio standards such as DECT, GSM, WACS or PACS, IS-54, IS-95, PHS, PDC, etc. [See IEEE Communications Magazine, January 1995, pages 50 through 57; D. D. Falconer et al, "Time Division Multiple Access Methods for Wireless Personal Communications"], ensuing, namely, wirelessly (for example, by radio transmission).

In the context of the present application, the term "Message" is a higher-ranking term that stands both for the content (information) as well as for the physical representation (signal of the communication). Despite the same content of a message—i.e., the same information—different signal forms can occur. Thus, for example, a message relating to a given subject matter can be transmitted (1) in the form of an image,
(2) as a spoken word message,
(3) as a written wordy message or,
(4) as an encrypted word or image.

The transmission type according to (1) . . . (3) above is thereby normally characterized by continuous (analog) signals, whereas discontinuous signals (for example, pulses, digital signals) generally arise in the transmission type according to (4).

Proceeding on the basis of this general definition of a message system, present the invention is directed to a wireless telecommunication system having CDMA, FDMA and TDMA multiple access components, particularly a "JD-CDMA" developed communication system that is hybrid with respect to multiple access methods.

In view of a universal mobile telecommunication system (UMTS), wireless telecommunication systems with CDMA, FDMA and TDMA multiple access components, particularly "JD-CDMA" telecommunication systems that are hybrid with respect to multiple access methods are referred to as the future radio telecommunication scenario of the third generation according to the publications (1): Nachrichtentechnik Elektronik, Berlin 45, 1995, No. 1, pages 10 through 14 and No. 2, pages 24 through 27, P. Jung, B. Steiner, "Konzept eines CDMA-Mobilfunksystems mit gemeinsamer Detektion für die dritte Mobilfunkgeneration"; (2): Nachrichtentechnik Elektronik, Berlin 41, 1991, No. 6, pages 223 through 227 and page 234, P. W. Baier, P. Jung, A. Klein: "CDMA—ein günstiges Vielfachzugriffsverfahren für frequenzeselektive and zeitvariante Mobilfunkkanäle"; (3): IEICE Transactions on Fundamentals of Electronics, Communications and Computer Sciences, Vol. E79-A, No. 12, December 1996, pages 1930 through 1937; P. W. Baier, P. Jung: "CDMA Myths and Realities Revisited"; (4): IEEE Personal Communications, February 1995, Pages 38 through 47; A. Urie, M. Streeton, C. Mourot: "An Advanced TDMA Mobile Access System for UMTS"; (5): Telekom Praxis, 5/1995, Pages 9 through 14, P. W. Baier: "Spread-Spectrum-Technik and CDMA—eine ursprünglich militärische Technik erobert den zivilen Bereich"; (6): IEEE Personal Communications, February 1995, Pages 48 through 53; P. G. Andermo, L. M. Ewerbring: "An CDMA-Based Radio Access Design for UMTS"; (7): ITG Fachberichte 124 (1993), Berlin, Offenbach: VDE Verlag ISBN 3-8007-1965-7, Pages 67 through 75; Dr. T. Zimmermann, Siemens AG: "Anwendung von CDMA in der Mobilkommunikation".

In the micro-cell or, respectively, macro-cell area of the GSM-specific radio telecommunication system, the radio telecommunication scenario of the second generation is being currently defined (Global System for Mobile Communication; see (1): Informatik Spektrum 14 (1991) June, No. 3, Berlin, DE, A. Mann: "Der GSM-Standard— Grundlage für digitale europäische Mobilfunknetze", Pages 137 through 152; (2): R. Steele: Mobile Radio Communications, Pentech Press, 1992 (Reprint 1994), Chapter 8: The Pan-European Digital Cellular Mobile Radio System—known as GSM, Pages 677 ff) and are being defined in the Pico-cell region by the DECT Telecommunication System [digital enhanced (previously: European) cordless telecommunication; see (1): Nachrichtentechnik Elektronik 42 (1992) January/February, No. 1, Berlin, DE, U. Pilger, "Struktur des DECT-Standards", Pages 23 through 29 in conjunction with ETSI Publication ETS 300175-1 . . . 9, October 1992; (2): Telcom Report 16 (1993), No. 1, J. H. Koch: "Digitaler Komfort für schnurlose Telekommunikation—DECT-Standard eröffnet neue Nutzungsgebiete", Pages 26 and 27; (3): tec 2/93—the technical magazine of Ascom, "Wege zur universellen mobilen Telekommunikation", Pages 35 through 42; (4): Philips Telecommunication Review, Vol. 49, No. 3, September 1991, R. J. Mulder: "DECT, a universal cordless access system"; (5): WO 93/21719 (FIGS. 1 through 3 with appertaining description)].

FIG. 1 shows the TDMA frame and TDMA time slot structure of the GSM mobile radio telephone concept known from the publications (1): Informatik Spektrum 14 (1991) June, No. 3, Berlin, DE, A. Mann: "Der GSM-Standard— Grundlage für digitale europäische Mobilfunknetze", Pages 137 through 152; (2): R. Steele: Mobile Radio Communications, Pentech Press, 1992 (Reprint 1994), Chapter 8: The Pan-European Digital Cellular Mobile Radio System—known as GSM, Pages 677 ff).

FIG. 2 shows a multiple access in the uplink (transmission direction "Mobile Part→abase station") from the publication Nachrichtentechnik Elektronik, Berlin 45, 1995, No. 1, Pages 10 through 14 and No. 2, Pages 24 through 27, P. Jung, B. Steiner, "Konzept eines CDMA-Mobilfunksystems mit gemeinsamer Detektion für die dritte Mobilfunkgeneration", which is particularly shown in FIG. 4 of this publication—standing for the plurality of wireless telecommunication systems with CDMA, FDMA and TDMA multiple access components—of a joint detection CDMA mobile radio concept.

For example, the plurality of subscribers simultaneously active in a time slot is K=8.

FIG. 3, proceeding from the illustration of the multiple access in FIG. 2, shows the time slot structure (burst structure) of the uplink (transmission direction "mobile part→base station") of the joint detection CDMA mobile radio concept that is known from the publication Konzept eines CDMA-Mobilfunksystems mit gemeinsamer Detektion für die dritte Mobilfunkgeneration", being particularly shown in FIG. 5 of this publication.

The 24 data symbols of the payload data blocks indicated in FIG. 3 are spread with a subscriber-specific spread code having a spread factor of Q=14, so that each data symbol contains 14 data elements fashioned as "chip".

SUMMARY OF THE INVENTION

The object underlying the present invention is comprised in adapting a wireless telecommunication system with a CDMA, FDMA and TDMA multiple access component, particularly what is a hybrid "JD-CDMA" telecommunication system with respect to multiple access methods compatibly to a GSM-specific/DECT-specific (micro-cell, macro-cell and/or Pico-cell-specific) telecommunication system with respect to the air interface.

As a result thereof, it is possible, on the one hand, to accept system components that have been hitherto successfully employed in GSM products/DECT products (microcell, macro-cell, and/or Pico cell-specific products) of the second mobile radio telephone/cordless telecommunication generation in future wireless telecommunication systems as well with CDMA, FDMA and TDMA multiple access components of the third mobile radio telephone/cordless telecommunication generation without involved modifications, and, on the other hand, to increase the acceptance by the network operators of the second mobile radio telephone/cordless telecommunication generation for a scenario of the third mobile radio telephone/cordless telecommunication generation designed in this way, in that the network operators can profit from the experience they have collected from the second mobile radio telephone/cordless telecommunication generation and can use this experience in a sliding transition to the universal mobile telecommunication system.

According to a first embodiment of the invention which provides a wireless telephone communication system with a CDMA, FDMA and TDMA multiple access component, particularly a hybrid "JD-CDMA" telecommunication system with respect to multiple access methods, having the following features:

(a) frequencies of frequency bands predetermined for the wireless telecommunication system are respectively subdivided into a plurality of time slots having a respectively predetermined time slot duration;

(b) respective telecommunication connections from a predetermined plurality of telecommunication subscribers can be simultaneously produced in the frequency bands of the wireless telecommunication system;

(c) the time slots respectively comprise a time slot structure having two payload data blocks—a first payload data block and a second payload data block, a training data block arranged between the payload data blocks and fashioned as "midamble" and a safe time zone arranged following training data block and one of the payload data blocks;

(d) a plurality of first data elements fashioned as a "chip" are respectively contained in the payload data blocks and the training data block;

(e) second data elements fashioned as a "stealing flag" for signaling purposes are arranged such between at least one of the payload data blocks and the training data block that the ration of the plurality of the data elements arranged before the training data block to the plurality of data elements arranged following the training data block is unequal to one; the idea underlying the invention is comprised, on the one hand, in arranging signaling information fashioned as a "stealing flag" for distinguishing between payload (or user information) and signaling channels in the provided time slot structure such that an asymmetrical distribution of time slots arises with respect to a training data block (as so called midamble) of the time slot structure. According to further embodiments in which the second data elements are arranged before the training data block, alternately, the second data elements are arranged after the training data block, or the second data elements are arranged in equal parts before and following the training data block; it is thereby particularly advantageous when the signaling information are placed immediately before and/or after the training data block for protection against time variance.

According to another embodiment which provides a wireless telephone communication system with a CDMA, FDMA and TDMA multiple access component, particularly a hybrid "JD-CDMA" telecommunication system with respect to multiple access methods, having the following features:

(a) frequencies of frequency bands predetermined for the wireless telecommunication system are respectively subdivided into a plurality of time slots having a respectively predetermined time slot duration;

(b) respective telecommunication connections from a predetermined plurality of telecommunication subscribers can be simultaneously produced in the frequency bands of the wireless telecommunication system;

(c) the time slots respectively comprise a time slot structure with two payload data blocks—a first payload data block and a second payload data block, a training data block arranged between the payload data blocks and fashioned as a "midamble", signaling data fashioned as a "stealing flag", and a safe time zone arranged following the training data block, the signaling data block and one of the payload data blocks;

(d) a plurality of first data elements fashioned as a "chip" are respectively contained in the payload data blocks and the training data block;

(e) the signaling data contain a plurality of second data elements;

(f) the transmission time duration of the data element amounts to a multiple of a predetermined, particularly GSM-specific clock frequency covering the numerical range from 5 through 7.

TABLE 1

| Area of System Employment | Estimate U = 5 | Estimate U = 6 | Estimate U = 7 |
|---|---|---|---|
| Mountains | Generally directly employable | Employable with outlay (for example, sectorized antenna) | Not employable |
| City | Over-dimensioned | Generally directly employable | Potentially employable for Pico cells |
| Building | Totally over-dimensioned | Over-dimensioned | Generally directly employable |

TABLE 2

| U | Estimate of the outlay | Estimate of the Required Bandwidth |
|---|---|---|
| 5 | Very high (9 symbol equalizer) | 1.92 MHz (9.6*GSM) → +20% |
| 6 | Moderate (5 symbol equalizer | 1.6 MHz (8*GSM) |
| 7 | low (3 symbol equalizer) | 1.37 MHz (6.9*GSM) → −14% |

With the development of the invention yet another embodiment, wherein the frequencies of the frequency band are respectively subdivided into eight time slots each having a respectively predetermined time slot duration of approximately 577 µs; the wireless telecommunication system with a CDMA, FDMA and TDMA multiple access component is (also) adapted to the GSM telecommunication system with respect to the time slot duration.

The development according to a further embodiment, wherein the first data elements are contained in first data symbols spread with a telecommunication subscriber-specific spread code having a spread factor of essentially 14 proves advantageous in view of the development according to claim 3 because the combination of the foregoing embodiment with telecommunication connections of essentially eight telecommunication subscribers which can be simultaneously produced in the frequency band of the wireless telecommunication system the foregoing and 4 yields a "8×8 checkerboard pattern", whereby the information (for example, GSM information) to be transmitted can—completely equivalently—be packed either in a CDMA code or in a time slot. Over and above this, such a combination is advantageous in the transmission of ISDN information via the air interface of the wireless telecommunication system with a CDMA-FDMA and TDMA multiplex access component.

Further advantageous developments of the invention are provided as well by an embodiment having the second data elements contained in second data symbols spread with a telecommunication subscriber-specific spread code having a spread factor of essentially 14. Preferably, the second data symbols are fashioned as the signaling data. Essentially 33 first data symbols are respectively contained in the payload data blocks. In one embodiment, the data symbols respectively contain two gross bits. The payload data transmission rate amounts to essentially 13 kBit/s given an interleaving depth of "4" and a convolution code having a code rate "0.5" and a constraint length of "5". Essentially "243" first data elements may be contained in the training data block. The safe time zone of one embodiment is of a time duration of at least 30 µs.

DETAILED PRESCRIPTION OF THE PREFERRED EMBODIMENTS

An exemplary embodiment of the invention is explained with reference to FIG. 4.

Figure 4:
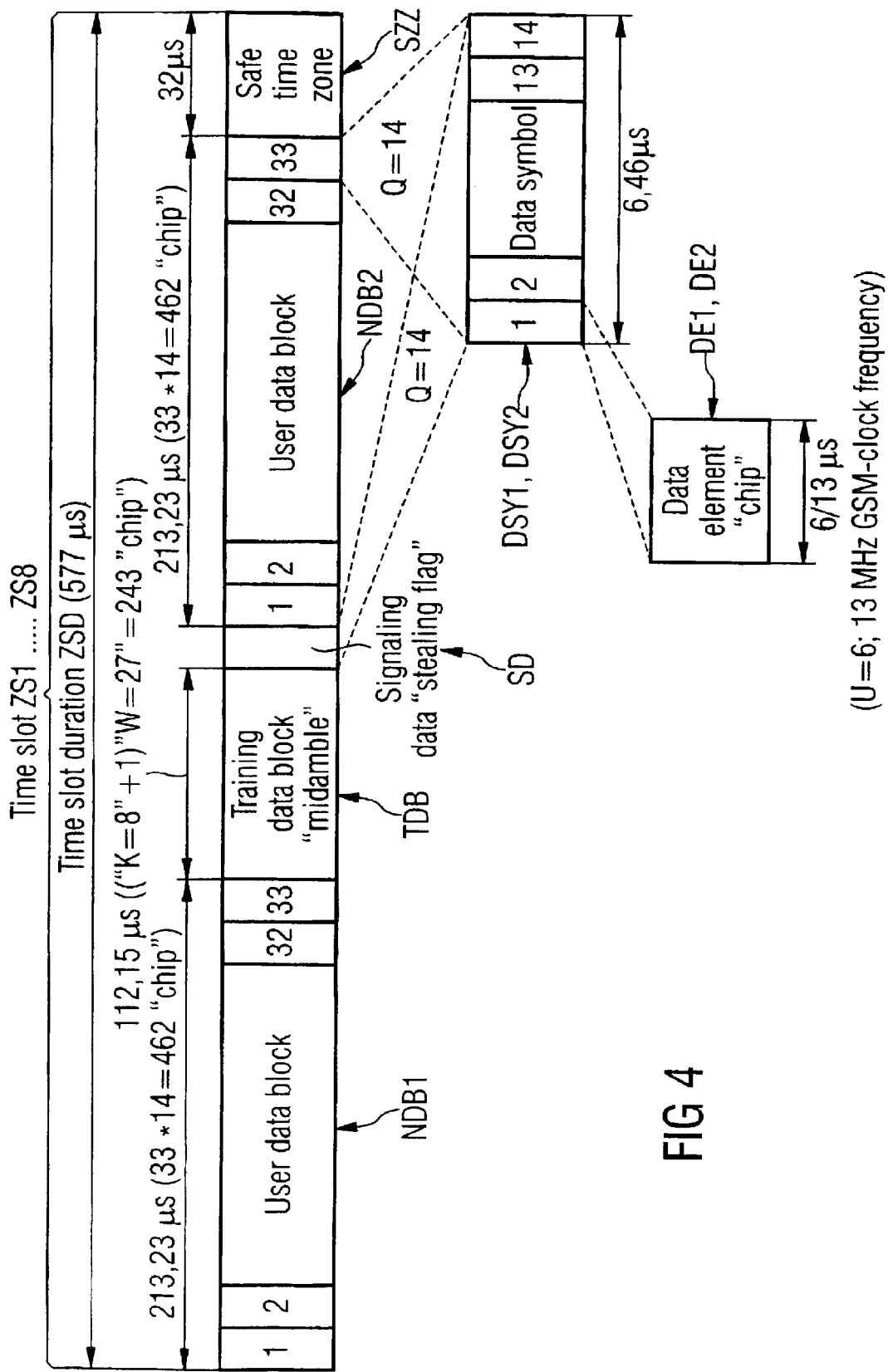
FIG. 4 is a diagram of a time slot structure of a wireless telecommunication system according to the invention.

FIG. 4 shows the time slot structure of a wireless telecommunication system with a CDMA, FDMA and TDMA multiple access component, particularly a hybrid "JD-CDMA" telecommunication system with respect to the multiple access methods.

Figure 1:
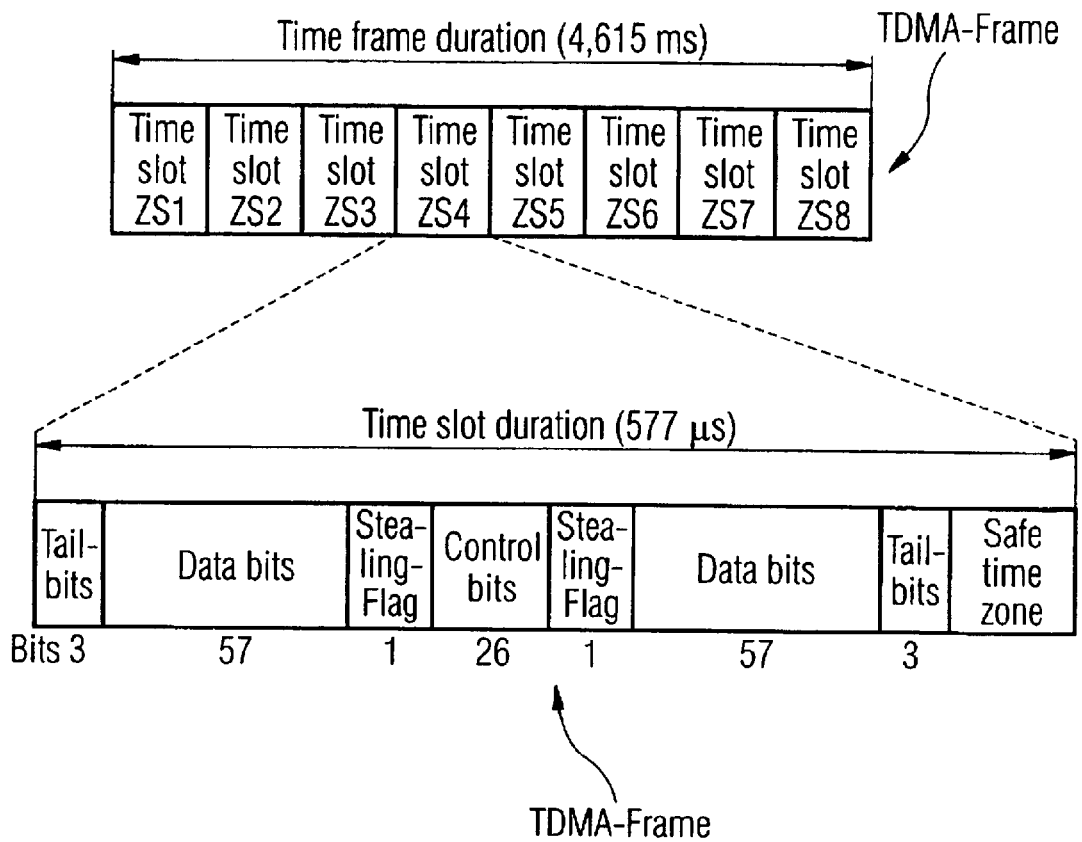
FIG. 1 is a diagram of a TDMA Frame known in the art.
Figure 2:
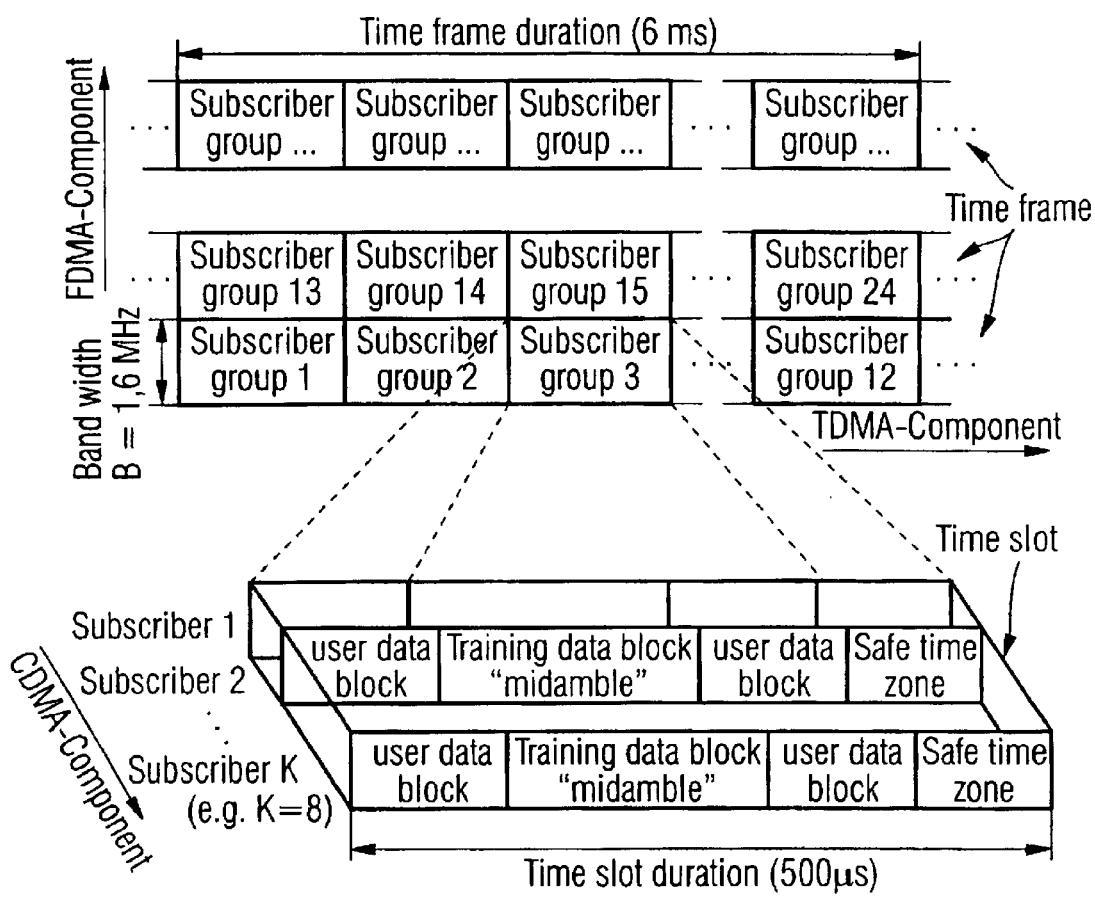
FIG. 2 is a diagram of a multiple access in the uplink known in the art.
Figure 3:
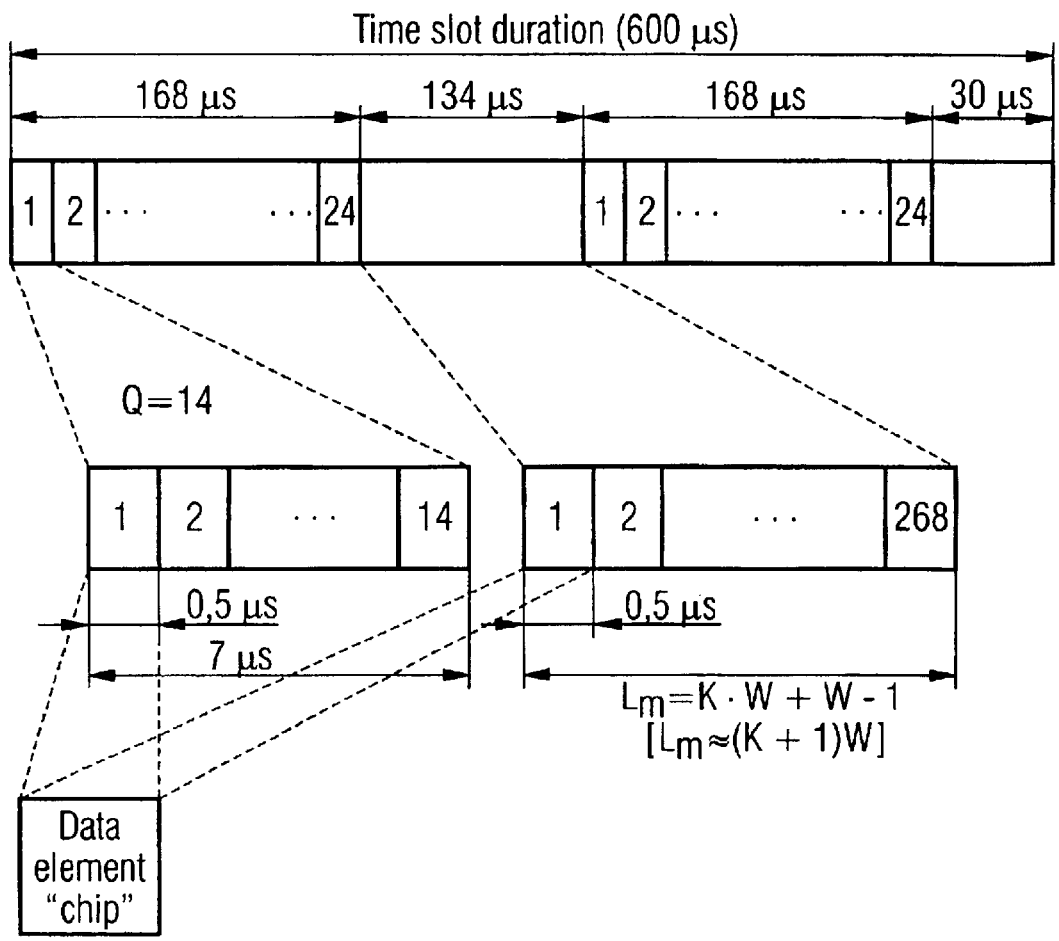
FIG. 3 is another diagram of the multiple access of FIG. 2 illustrating the time slot structure of the uplink.

Proceeding from FIGS. 2 and 3, FIG. 4, shows the time slot structure of a wireless telecommunication system with a CDMA, FDMA and TDMA multiple access component, particularly a hybrid "JD-CDMA" telecommunication system with respect to multiple access methods, that, with respect to the time slot duration ZSD (approximately 577 µs) and the transmission time duration of a data element DE1, DE2 contained in the time slot structure and fashioned as "chip", is compatibly adapted to the GSM telecommunication system having a time slot duration of approximately 577 µs and a GSM clock frequency of 13 MHz (see FIG. 1).

The compatible adaption can be taken even farther when the following parameters based on the GSM conditions are employed overall.

| | |
|---|---|
| GSM Frame duration: 4.615 ms | $T_{fr}$ |
| GSM burst duration: 577 µs | $T_b$ |
| GSM clock: 13 MHz | $f_{tr}$ |
| GSM signaling channels: all 13 frames | $P_{sig}$ |
| GSM payload bit rate: 13 kBit/s | D |
| Convolution code with code rate: 0.5 | R |
| Constraint length: 5 | $L_c$ |
| Interleaving depth: 4 | $I_D$ |
| Gross bits per symbol (for example 4PSK modulation): 2 | m |
| Subscribers per burst: 8 | K |
| Spread factor: 14 | Q |
| Duration of the pulse response per subscriber: >12 µs | $T_{imp}$ |
| Safe time zone duration: approximately 30 µs | $T_g$ |

Calculation of the Bits per Interleaving Frame:

$$B_f = D * I_D T_b * P_{sig}/(R*(P_{sig}-1))=260$$

1. Calculation of the Plurality of Symbols per Burst:

Starting point, 260 payload bits per interleaving frame (GSM):

Taking the tail bits of the convolution encoder into consideration:

$$B_{it}=B_f+(L_c-1)=264$$

Gross bits per interleaving frame:

$$B_{ibr}=B_{it}/R=528$$

Symbols per burst (with stealing flag):

$$S_b=B_{ibr}/(m*I_D)+1=67$$

2. Spread Factor—Number of Subscribers per Burst

Value recommended in the literature: Q≧1.5*K=12→selected: Q=14

3. Chip Duration $T_c$:

Although other modifications and changes may be suggested by those skilled in the art, it is the intention of the inventors to embody within the patent warranted hereon all changes and modifications as reasonably and properly come within the scope of their contribution to the art.

Chip duration must be capable of being derived from the GSM clock:

$$T_c = U/f_t = (U/13) \mu s$$

"U" is then defined such that $T_g$ and $T_{imp}$ are adhered to and a great deal of resources are not wasted.

U=5:

Length of the "midamble"

$$T_m = T_b - T_g - S_b * Q * T_c = 186.23 \mu s \approx 484 \text{ Chip} = L_m$$

$L_m \geq K*W+W-1 \rightarrow W=53$ Chip (pulse response length in chip) or, respectively, 20.38 μs given W=53, $L_m$=476 Chip applies The safe time zone duration is thus:

$$T_g = T_b = (L_m + S_b * Q) * T_c$$
$$= 33.15 \mu s$$

U=6:

Length of the "midamble":

$$T_m = T_b - T_g - S_b * Q * T_c = 114.08 \mu s \approx 247 \text{ Chip} = L_m$$

$L_m \geq K*W+W-1 \geq \rightarrow W=8$ Chip (pulse response length in chip) or, respectively, 12.46 μs Given W=27 $L_m$=242 Chip==>$L_m$=243 Chip is selected The safe time zone duration is thus:

$$T_g = T_b = (L_m + S_b * Q) * T_c$$
$$= 32.92 \mu s$$

U=7:

Length of the "midamble":

$$T_m T_b - T_g - S_b Q * T_c = 41.92 \mu s \ 77 \text{ chip} = L_m$$

$L_m \geq K*W+W-1 \rightarrow W=8$ chip (pulse response length in chip) or, respectively, 4.61 μs Given W=8, $L_m$=71 chip applies The safe time zone duration is thus:

$$T_g = T_b = (L_m + S_b * Q) * T_c$$
$$= 33.69 \mu s$$

We claim:

1. A method for wireless telephone communication to compatibly adapt an air interface in a wireless telecommunications system with a CDMA, FDMA and TDMA multiple access component to a GSM/DECT-specific telecommunications system, the method comprising the steps of:

respectively subdividing frequencies of frequency bands predetermined for the wireless telecommunications system into a plurality of time slots having a respectively predetermined time slot duration;

simultaneously producing respective telecommunication connections from a predetermined plurality of telecommunication subscribers in the frequency bands of the wireless telecommunications system;

providing the plurality of time slots with a respective time slot structure including first and second payload data blocks, a training data block positioned between the first and second payload data blocks which serves as a midamble, and a safe time zone positioned after both the training data block and one of the first and second payload data blocks;

providing a plurality of first data elements, fashioned as chip, in both the first and second payload data blocks as well as the training data block; and positioning a plurality of second data elements, fashioned as stealing flags for distinguishing between payload and signaling channels, between at least one of the first and second payload data blocks and the training data block, wherein a ratio of the plurality of first and second data elements positioned before the training data block to the plurality of first and second data elements positioned after the training data block is unequal to 1.

2. A method for wireless telephone communication to compatibly adapt an air interface in a wireless telecommunications system with a CDMA, FDMA and TDMA multiple access component to a GSM/DECT-specific telecommunications system, the method comprising the steps of:

respectively subdividing frequencies of frequency bands predetermined for the wireless telecommunications system into a plurality of time slots having a respectively predetermined time slot duration;

simultaneously producing respective telecommunication connections from a predetermined plurality of telecommunication subscribers in the frequency bands of the wireless telecommunications system;

providing the plurality of time slots with a respective time slot structure including first and second payload data blocks, a training data block positioned between the first and second payload data blocks which serves as a midamble, signaling data which serve as stealing flags for distinguishing between payload and signaling channels and which are positioned between the training data block and one of the first and second payload data blocks, and a safe time zone positioned after the training data block, the signaling data and one of the first and second payload data blocks;

providing a plurality of first data elements, fashioned as chip, in both the first and second payload data blocks as well as the training data block;

providing the signaling data with a plurality of second data elements; and providing that a transmission time duration of a respective first data element amounts to a multiple of a GSM/DECT-specific clock frequency, the multiple ranging from 5 through 7.

3. A method for wireless telecommunication according to claim 1, further comprising the step of:

subdividing the frequencies of the frequency band respective into eight time slots each having a respectively predetermined time slot duration of approximately 577 μs.

4. A method for wireless telecommunication according to claim 1, further comprising the step of:

producing telecommunication connections of essentially eight telecommunication subscribers simultaneously in the frequency band of the wireless telecommunication system.

5. A method for wireless telecommunication according to claim 1, further comprising the step of:

spreading the first data elements contained in first data symbols with a telecommunication subscriber-specific spread code having a spread factor of essentially 14.

6. A method for wireless telecommunication according to claim 1, further comprising the step of:

spreading the second data elements contained in second data symbols with a telecommunication subscriber-specific spread code having a spread factor of essentially 14.

7. A method for wireless telecommunication according to claim 6, wherein the second data symbols are fashioned as the signaling data.

8. A method for wireless telecommunication according to claim 5, wherein essentially 33 first data symbols are respectively contained in the payload data blocks.

9. A method for wireless telecommunication according to claim 5, wherein the data symbols respectively contain two gross bits.

10. A method for wireless telecommunication according to claim 3, wherein the payload data transmission rate amounts to essentially 13 kBit/s given an interleaving depth of "4" and a convolution code having a code rate "0.5" and a constraint length of "5".

11. A method for wireless telecommunication according to claim 1, wherein essentially "243" first data elements are contained in the training data block.

12. A method for wireless telecommunication according to claim 1, wherein the safe time zone comprises a time duration of at least 30 $\mu$s.

13. A method for wireless telecommunication according to claim 1, wherein the second data elements are arranged before the training data block.

14. A method for wireless telecommunication according to claim 1, wherein the second data elements are arranged after the training data block.

15. A method for wireless telecommunication according to claim 1, wherein the second data elements are arranged in equal parts before and following the training data block.

* * * * *